Sept. 25, 1934.　　　M. A. SERTILLANGE　　　1,975,023
REMOTE CONTROL DEVICE
Filed Oct. 25, 1933
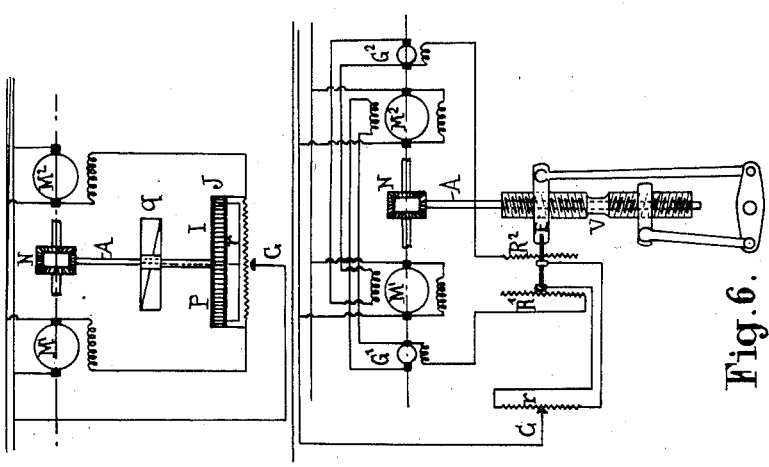
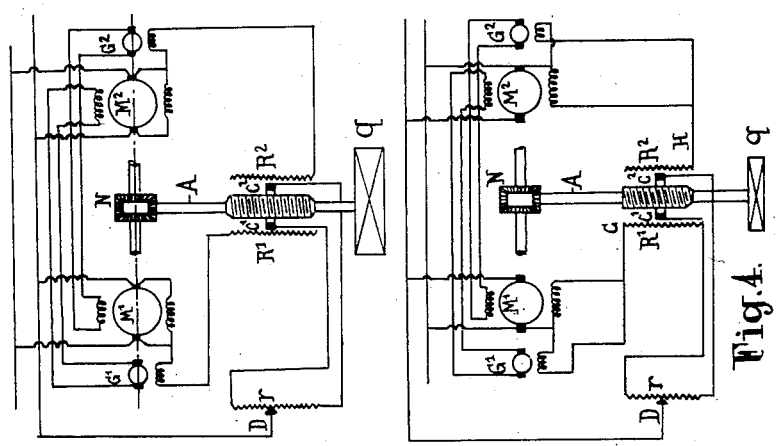
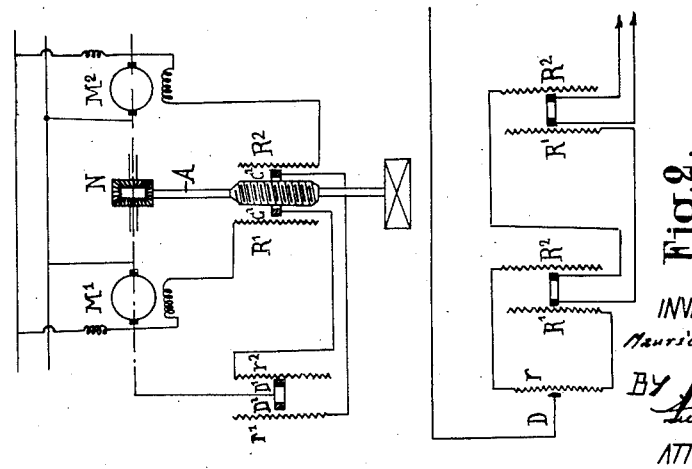
INVENTOR:
Maurice A. Sertillange
BY
ATTORNEY Patented Sept. 25, 1934

1,975,023

UNITED STATES PATENT OFFICE 1,975,023

REMOTE CONTROL DEVICE

Maurice Antoine Sertillange, Brest, France, assignor to Etablissements Paul Duclos, Marseille, France, a corporation of France Application October 25, 1933, Serial No. 695,204
In France October 27, 1932

3 Claims. (Cl. 172—239)

This invention relates to a remote control device, which may be controlled from a distant point and which is adapted to serve for the control of any appliance or device, such as ship rudders, sluice valves, platforms, turrets, valves, distance indicators and the like.

Said device also provides for the indication at a distance of the momentary position of the controlled apparatus.

The device according to the invention essentially consists of a mechanical differential, two prime movers with a variable speed, a control device, and a positive action device. For certain applications the device will also comprise auxiliary generators and a distance position indicator.

In order to make my invention more clearly understood, I have shown in the accompanying drawing means for carrying the same into practical effect without limiting the improvements in their useful applications to the particular constructions which, for the purposes of explanation, have been made the subject of illustration.

Figure 1 is a schematic view of a device according to the present invention.

Fig. 2 is a schematic view of the field circuits of the driving motors of the device of the invention.

Fig. 3 is a view similar to Fig. 1 of a modified form of my invention.

Fig. 4 is a schematic view showing a still further modification of my invention.

Fig. 5 is another schematic view of another modified form of the invention.

Fig. 6 is still another schematic view of a form of my invention as applied to the control of a ship's rudder.

In the following description it is assumed that electric motors are used. However, the use of any other motor with a variable speed is also possible without departing from the scope and the spirit of the invention.

Both primary shafts of the mechanical differential N (Figure 1) are driven by two electric motors M1 and M2. In series with the field winding of motor M1 are variable resistances R1 and r2 and in series with the field winding of motor M2 are variable resistances R2 and r1.

The control of the slides C1, D1, C2, D2 of said variable resistances is so arranged that C1 and C2 move together and D1 and D2 move together. The resistances are so mounted that on moving C1, C2 and D1, D2 the current flowing through the circuit of the motor M1 varies inversely with respect to the current flowing through the motor M2.

D1 and D2 are manually or otherwise suitably controlled. Control of C1, C2 is effected through a shaft A coupled to the secondary shaft of the differential. Said shaft A also drives the apparatus to be controlled.

The apparatus is so set up that, the slides C1, C2, D1, D2 being in a predetermined position, both motors run at the same speed, so that the shaft A remains at rest.

Displacement in one direction of D1, D2 effects an increase in the field of one of the motors, thereby producing a diminution of the speed of said motor, and in the opposite direction a decrease in the field of the other motor, thereby increasing the speed of said other motor. Variation of the relative speed of the two motors causes the shaft A to move. Said movement simultaneously produces the displacement of the apparatus to be controlled and of the slides C1 and C2. Since the displacement of C1 and C2 produces a variation of the part of the resistances R1 and R2 introduced into the field circuits of the motors M1 and M2, it re-establishes the equality of the fields and thus the equality of the motor speeds and, therefore, brings the shaft A to rest in a well determined position exactly corresponding to the position of the slides D1, D2.

The position of slide C1, C2 bears a definite relation to that of slide D1, D2 in that upon moving slide D1, D2 to a certain position slide C1, C2 will be moved by shaft A to a corresponding position to balance the electrical effect of the displacement of slide D1, D2.

The distance between D1, D2 and C1, C2 can be as great as it is desired.

In Fig. 2 I have shown the addition, to the circuit of the motors, of a certain number of twin resistances such as $r1$, $r2$ in as large a number as desired. Thus, either a control of several stations or a displacement of the shaft A proportional to the algebraic sum of the displacements of the slides such as D1, D2 on the resistances $r1$, $r2$ (Figure 2) is obtained.

As a modification I contemplate the replacement of the last resistance couple such as $r1$, $r2$, by a single resistance $r$ mounted as a potentiometer (Figure 2), the displacement of the slide of the potentiometer playing the part of the displacement of the slides D1, D2.

In Fig. 3 I have illustrated a further modification consisting of the addition, on the shaft of each motor M1, M2 of generators G1, G2 feeding an electric circuit directly acting on the field of the motors. In this instance the generator secured on the shaft of motor M1 acts on the field of motor M2 and the generator secured on the shaft of motor M2 acting on the field of motor M1.

The field windings of said generators can be mounted, either with a separate excitation or in shunt, with the main field windings of the motors. This arrangement is designed, on the one hand, for reinforcing the torque of the motors and, on the other hand, for forming another system of control acting on the excitation of the generators and requiring a current which can be exceedingly small (Figure 3). Any other arrangement of these generators pertains to the invention.

I contemplate the connecting of the field windings of the generators in parallel with the main field windings of the motors so that the currents in the field windings of both motors and generators are simultaneously controlled by the variable resistances. Thus, in the circuit of the generators, a current is obtained the value of which depends on the direction of the shifting existing between the apparatus to be controlled and the control slide, said current acting directly on the motors M1, M2 and having the tendency to do away with any shifting.

Said device increases the torque of the motors, the precision of the control and diminishes the lag of the control.

The replacement of the electric action due to the resistances R1, R2 by an action due to the displacement of a control resistance directly dependent on the apparatus to be controlled is shown in Fig. 5.

A pinion P carried by shaft A drives the rack J. Rack J carries the resistance r, which is mounted as a potentiometer. As in the former case, upon shifting the slide C the shaft A is moved in such a direction as to move the resistance r in the same direction as the slide. Equilibrium is obtained when the position of A corresponds exactly to the position of the slide.

The invention also embodies, on the one hand, the connection of double resistance such as r1, r2 connected with the rack J, the connection of said resistances with the field of the auxiliary generators such as G1, G2 in the same manner as before and, on the other hand, the use of any device through which the displacement of the resistances r or r1, r2 is effected by the shaft A.

An embodiment of the present invention adapted to the steering of the rudder of a ship will be described by way of example.

The operation for the steering of a rudder is as follows (Figure 6).

The screw apparatus V acting on the swing-tree keyed on the rudder-stock through the medium of two man-ropes is driven by the shaft A connected with the differential N rotated by both motors M1 and M2 on the shafts on which the auxiliary generators G1 and G2 are also keyed. Said generators feed in part the field of the motors M1, M2, G1 feeding the field of M2 and conversely.

The control device which is located, for instance, on the bridge is formed of the resistance r which is mounted as a potentiometer in the excitation circuit of the generators, in which circuit the positively acting resistances R1 and R2 are also inserted. The displacement of the slide C disturbs the equilibrium in the excitation of the generators G1 and G2 and effects a movement of the shaft A. The slides D1, D2 of the resistances R1, R2 are controlled by one of the nuts E of the screw apparatus.

The advantages of the device are the precision of the steering and the variable speed which can be obtained for the rudder without strain. Since the motors are always in action, the inconveniences and complications due to the rough starting and stopping operations of the motors are avoided.

A simple change switch acting on two wires permits steering from one station or from another station. The coupling between the steering station and the rudder is effected through three wires only. The slide C can be easily actuated by any automatic apparatus connected with the head of the ship and thus insuring the automatic maintaining of the course.

On account of the very small strain required for the displacement of the slide C, the automatic steering is exceedingly easy to obtain and can be insured, more particularly, by association with a repeating device of a gyroscopic compass.

I claim as my invention:

1. A remote control device comprising a pair of electric motors each having field windings and a rotary shaft, a differential mechanism connecting said shafts and provided with a secondary shaft, the speed of rotation of which is proportional to the difference in the speeds of the motor shafts, a generator, having a field winding, mounted on each motor shaft, means connecting a field winding of one motor with the generator mounted on the shaft of the other motor, whereby a field winding of each motor is excited by the generator driven by the other motor, a variable resistance in series with the field winding of each generator, means adapted to be operated by the secondary shaft of the differential mechanism for simultaneously varying said resistances in inverse relation, and other means in series with said generator windings for varying the resistance to flow of current through the winding of one generator inversely with respect to the flow through the winding of the other generator.

2. A remote control device comprising a pair of electric motors each having field windings and a rotary shaft, a differential mechanism connecting said shafts and provided with a secondary shaft, the speed of rotation of which is proportional to the difference in the speeds of the motor shafts, a generator, having a field winding, mounted on each motor shaft, means connecting a field winding of one motor with the generator mounted on the shaft of the other motor, whereby a field winding of each motor is excited by the generator driven by the other motor, a variable resistance in series with the field winding of each generator, means adapted to be operated by the secondary shaft of the differential mechanism for simultaneously varying said resistances in inverse relation, other means in series with said generator windings for varying the resistance to flow of current through the winding of one generator inversely with respect to the flow through the winding of the other generator, and means connecting another field winding of each motor to a substantially constant source of excitation current.

3. A remote control device comprising a pair of electric motors each having field windings and a rotary shaft, a differential mechanism connecting said shafts and provided with a secondary shaft, the speed of rotation of which is proportional to the difference in the speeds of the motor shafts, a generator, having a field winding, mounted on each motor shaft, means connecting a field winding of one motor with the generator mounted on the shaft of the other motor, whereby a field winding of each motor is excited by the generator driven by the other motor, means for connecting another field winding of each motor in parallel with a field winding of the generator driven thereby, a variable resistance connected in series with each group of paralleled motor and generator windings, means for simultaneously operating said variable resistances to vary the current flow through one group of windings inversely relative to that through the other group, a second variable resistance in series with each group of paralleled motor and generator windings, and means driven by the secondary shaft of the differential mechanism for varying the second resistances of both paralleled groups simultaneously and in inverse relation to each other.

MAURICE ANTOINE SERTILLANGE.